United States Patent
Braillard et al.

[15] 3,640,002
[45] Feb. 8, 1972

[54] MAN-TO-MACHINE PERIPHERAL COMMUNICATION DEVICE

[72] Inventors: Pierre L. Braillard, Saint-Cloud; Jean-Louis Moreuil; Marius Steru, both of Paris, all of France

[73] Assignee: Compagnie Generale D'Electronique Industrielle Lepaute CGEI-Lepaute, Paris, France

[22] Filed: June 22, 1970

[21] Appl. No.: 48,346

[30] Foreign Application Priority Data

June 23, 1969 France...................................6921005

[52] U.S. Cl.................................35/8 R, 35/35 H, 340/172.5
[51] Int. Cl.........................................................G09b 1/06
[58] Field of Search ........................35/9 D, 9 C, 35 H, 48 R; 340/172.5

[56] References Cited

UNITED STATES PATENTS 3,252,230   5/1966   Donev.......................................35/9 R
3,522,665   8/1970   Kalt...........................................35/9 R

*Primary Examiner*—Wm. H. Grieb
*Attorney*—Abraham A. Saffitz

[57] ABSTRACT

A man-to-machine peripheral communication device comprising a matrix having a number of matrix positions, a plurality of character supports each of which may be inserted in one of said positions, and interconnection means between said support and matrix for translating the character or characters borne by said supports into coded electrical signals. The said translating means may be electromechanical, electromagnetic, electrostatic or optical. The coded signal may be visually displayed or transmitted to data processing or storing equipment.

10 Claims, 8 Drawing Figures

INVENTORS:
Pierre L. BRAILLARD,
Jean-Louis MOREUIL,
Marius STERU

ATTORNEY

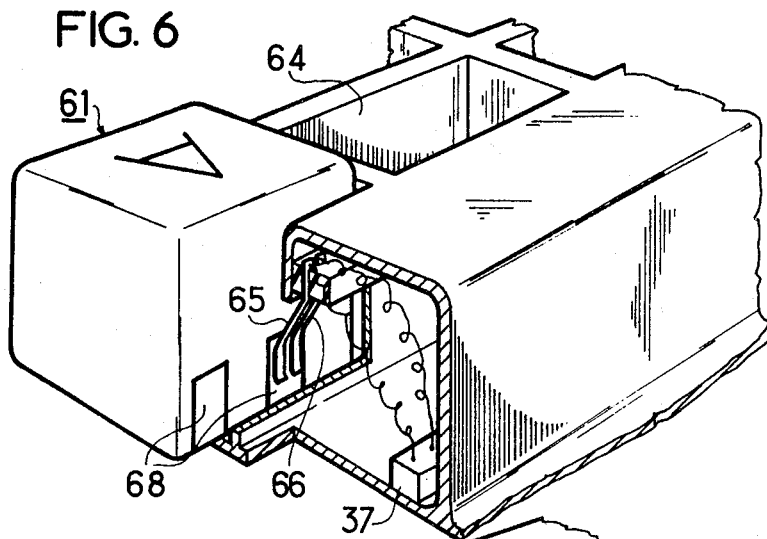
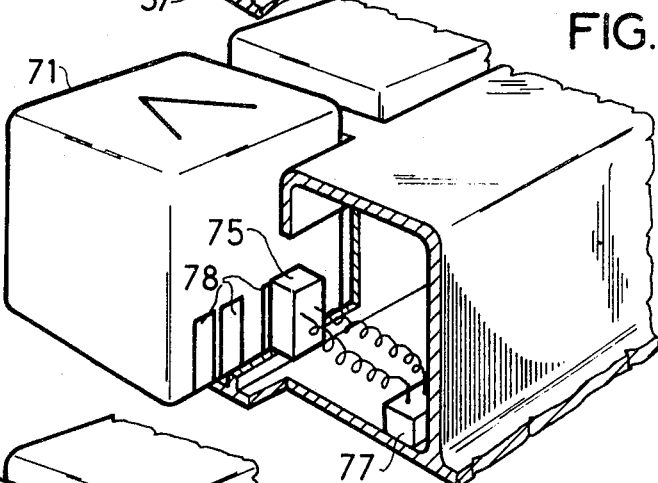
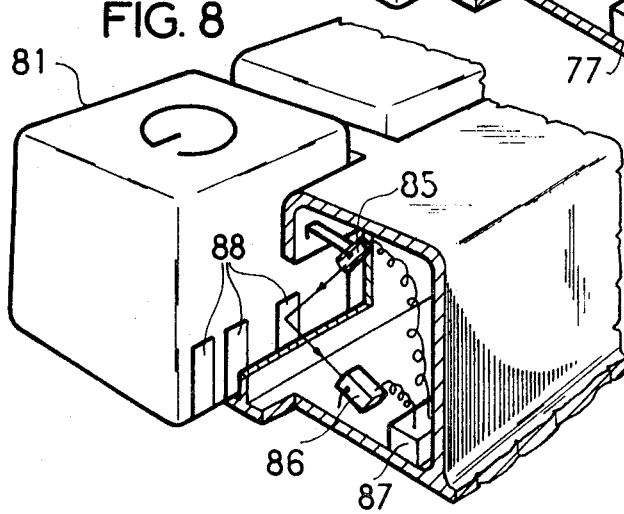

MAN-TO-MACHINE PERIPHERAL COMMUNICATION DEVICE

The present invention relates to means for the man-to-machine communication of information made up of characters such as letters, digits, signs or symbols.

More specifically, the invention relates to a device designed to set up, display, encode and store information composed of such characters to be conveyed to some data handling equipment, such as a computer or an information memory unit for subsequent processing.

The device which is the object of the invention is mainly, but not exclusively, intended for teaching purposes, and is suitable for use as a complete or partial examination aid by the pupil, who is thus enabled to answer questions, the answers being processed afterwards by the said data handling equipment.

The device of the invention has the following features:

a. Bearing the said characters are separate solid supports, with at least one character to each support.

b. To each character, which constitutes an information element in a form accessible to man, there corresponds a set of code-forming circuit elements, thereafter called, for lack of a better term, "intercode," and representing each character it is associated with.

c. The "intercodes" carried by the supports and corresponding to the various characters featured thereon may, though do not necessarily, consist of areas with holes or projecting parts; or having distinctive magnetic or dielectric properties, or else light transmitting or reflecting surfaces. The intercodes are used to encode information in a form suitable to be handled by the data processing or information storage unit incorporated in the device under review.

d. The said supports, each of which accordingly carries at least one character and the associated intercode, are selected and placed, e.g., by hand, on a matrix including a certain number of matrix positions suitable to accommodate one support each. These matrix positions may be compartments, cells or squares of the matrix.

Each matrix position is provided with a coding unit acted upon by the intercode on the support located in the considered particular matrix position. This results in the formation of the code corresponding to the character with which the said intercode is associated and in the transmission of that code to the said data processing unit.

e. The said coders may be, but need not exclusively be, of the electrical relay or switch type, or may involve magnetic circuits, inductance or capacitance circuitry or operate by means of photocells.

The present invention will be more easily understood from the following description, made with reference to the annexed drawings, in which:

FIGS. 6, 7 and 8 show arrangements in which the intercode elements borne by the support use respective electrically conductive contacts, magnetic or dielectric elements and light-reflecting elements for the completion of the coder circuits associated with the said support.

Figure 1:
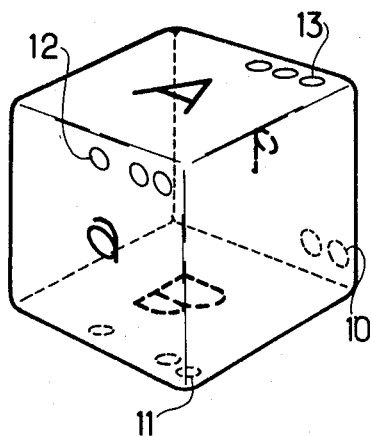
FIGS. 1 and 2 show two types of support used in the device of the invention.

The support shown in FIG. 1 has a cubic shape. Four of its faces will bear four characters, such as A, a, B, b.

Associated with the four characters are four "intercodes" (in this instance identical holes) distributed in accordance with a certain code, each on one cube face, for instance on one face adjacent to that carrying the corresponding character. Thus, associated with the letter "A" is intercode 10, with "a" intercode 13, with "B" intercode 12, and with "b" intercode 11.

Figure 2:
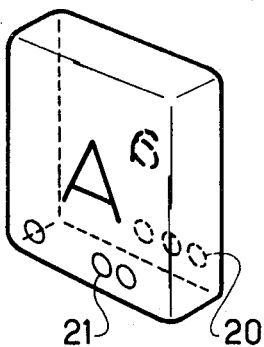

The support shown in FIG. 2 is a rectangular parallelepiped bearing two characters, one on either of its larger faces, e.g., the letter "A" on one large side and the letter "a" on the opposite side, together with the two intercodes 20 and 21 respectively corresponding to these characters.

Figure 3:
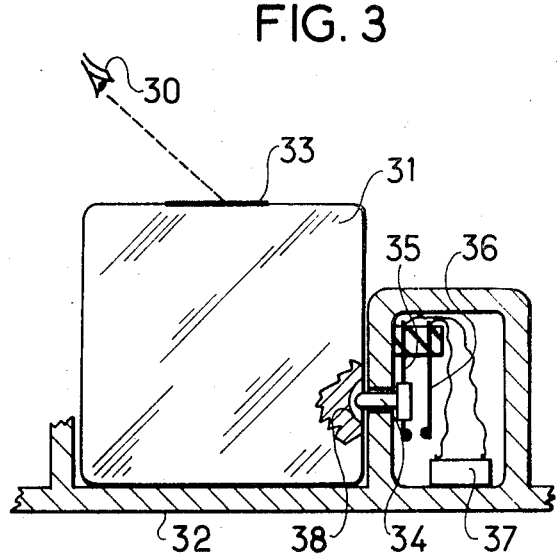
FIGS. 3 and 4 show sections through two different parallel planes of a relay contact-type coder in two alternative positions.
Figure 4:
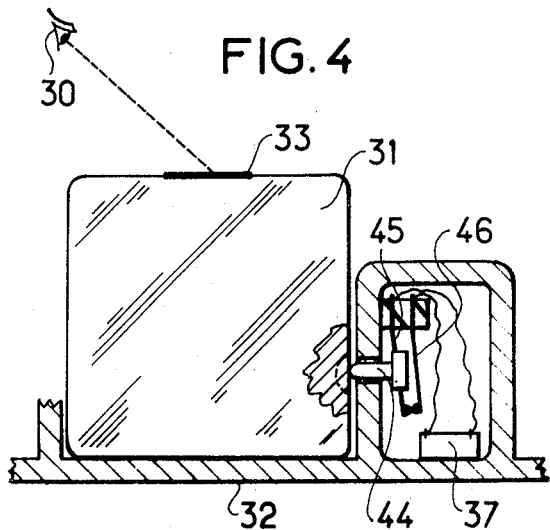

With the supports placed on the matrix, the intercodes operate on the coders, an embodiment of which is illustrated in FIGS. 3 and 4. A support is located in compartment 32 of the matrix in such a way that that cube side bearing the chosen character 33 faces upwards, thus being visible to the user's eye. The working part of the coder is a relay assembly with two flexible strips, each actuated by a contact stud affixed to one of the flexible strips and suitable to detect the presence or absence of a hole or projecting part on the intercode located in the corresponding support section.

In FIG. 3, contact stud 34 detects the presence of hole 38 in support 31. The two flexible strips 35 and 36 are not in contact, thus constituting a relay in the "open" position.

As said above, an intercode must be representative of the corresponding character. The material representation of the character by binary coding is carried out by a combination of relay positions, the relays being open or closed according as they are operated upon by the various intercode elements, whose maximum number depends on the number of usable characters. By way of example, for pure binary coding, and a set of 64 characters, the intercodes will be made up of one to six holes placed at particular support points. With a support located, for instance, in a matrix compartment, six relays so mounted as to face the predetermined points sense out the presence or absence of these holes. A combination of relay positions gives the coded version of the relevant character. This combination is converted into analog electrical data by circuit 37 connected to each of the relays located in one and the same compartment. In some cases, the use of redundant binary coding might well be of a certain interest as a means of improving the operational reliability of the device. This would call for more intercode parts and more relays for each other. The relays may also be of a different type from those described and illustrated, e.g., they may be "closed" in response to a hole and "open" in the absence of any hole.

As long as the supports of the characters that make up an item of information retain their respective matrix positions in the order required to properly represent that item, the corresponding information is set up, displayed, coded and stored.

Figure 5:
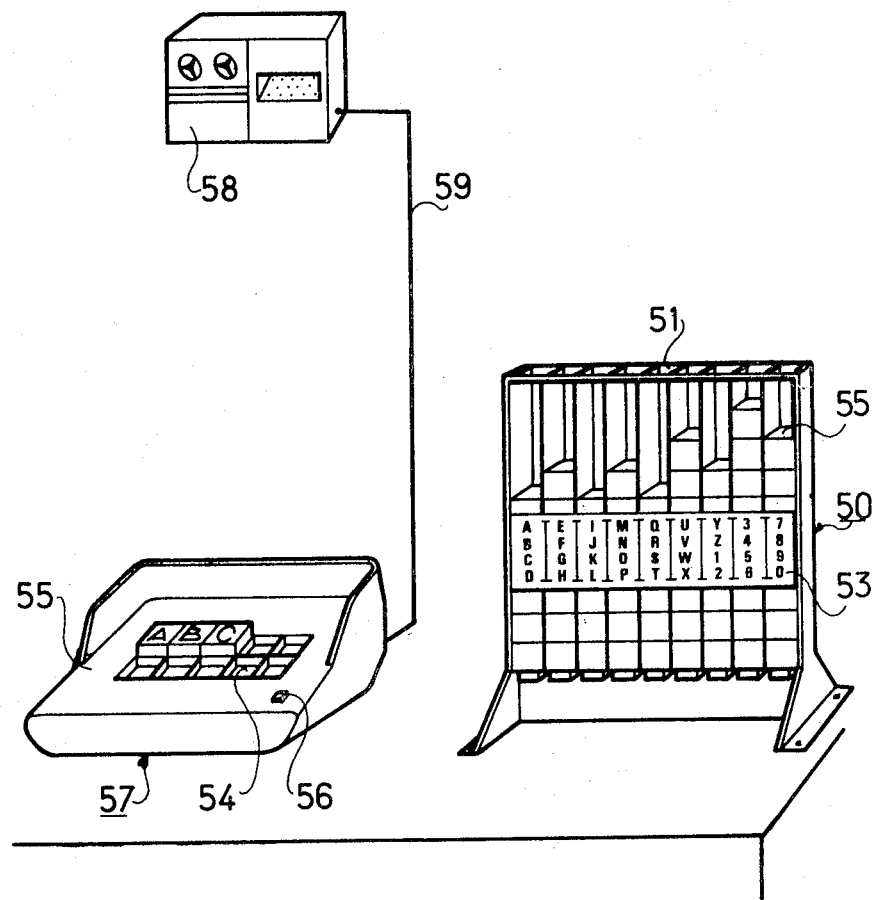
FIG. 5 is a schematic diagram of a system including a device according to the invention.

As shown in FIG. 5, a device according to the invention comprises:

a. A character store 50 where supports such as 55 are filed in holders such as 51, which are easy of access. A label 53 can indicate the types of characters borne by the supports to be found in each holder;

b. a console 57 with a compartmented matrix 54 designed to accommodate supports 55; the matrix has enough pigeonholes 54 to spell out an item of information.

c. a data handling unit 58 such as a computer linked up with console 57 by an electrical connection 59, and lending itself to the inputting, in encoded form, of the information set up in the matrix; the information is transferred from console 57 to data handling unit 58 by means of a console transfer button 56 actuated by the operator.

Another design variant of the device of the invention, shown in part in FIG. 6, makes use of supports 61, the intercodes of which feature electrically conductive sections 68 which may or may not be provided on the surface of each support. Matrix compartments 64 are equipped with coders made up of electric contact pairs, like the elastic metal strips 65 and 66. Upon a support being placed in a matrix position, each current-carrying element of the intercode associated with the chosen character establishes conductive connection between the two metal-strip contacts of the coder opposite, while each nonconducting section will fail to make electric contact between the pair of metal strips facing it. The combination of these open and closed states of electric contact carries out the encoding of the chosen character. The said conductive sections or areas can be ensured, e.g., by metal-plating or by the insertion of metal parts, or by laying metal surfaces bare.

In still another design variant of the device of the invention, shown in part in FIG. 7, each support 71 is provided with at least one intercode formed by sections 78 which may or may not be provided on the support surface. These sections are made from materials of high-magnetic permeability.

Each coder incorporates a certain number of detector circuits 75 whose state of magnetic polarization is influenced by the proximity of the high-permeability intercode sections of the support located in the particular considered matrix position. The combination of the polarization states of the detector circuits 75 of a coder carries out the encoding of the chosen character on the support whose intercode faces the said coder. Circuit 77 can thus work out the encoded version of the said character for transmission of the corresponding information to the data processing or memory unit associated with the device covered by the invention.

In a further variant of the device of the invention, not illustrated here but analogous to the one shown in FIG. 7, each support bears at least one intercode consisting of sections of high-permeability material, which may be provided on the support surface or may be absent therefrom. Each coder includes some inductive elements whose inductances are influenced by the proximity of the high-permeability intercode sections on the support accommodated in the corresponding particular matrix position. The combination of states of these inductive coder elements carries out the encoded version of the chosen character on the support whose intercode faces the said coder.

In still another variant of the device of the invention, not illustrated here but analogous to the one shown in FIG. 7, each support is provided with at least one intercode formed by the presence on, or absence from, the support surface of sections made from materials having a high dielectric constant (permittivity). Each coder incorporates a number of capacitive elements whose capacitances are affected by the proximity of the said sections on the support placed in the particular matrix position. The combination of states of the capacitive coder elements carries out the encoded version of the chosen character on the support whose intercode faces the said coder.

In still another design variant of the device under review, shown in FIG. 8, each support 81 has at least one intercode made up of sections 88 reflecting to light from an electric power source 85 included in the device. Each coder incorporates a number of photoelectric cells 86, illuminated or not, depending on whether or not they receive the luminous energy reflected by the intercode sections of the support placed in the particular matrix position facing the said coder. The combination of states of the coder photocells 86 carries out the encoding of the chosen character on the support whose intercode faces the said coder. Circuit 87 can thus work out the coded version of the said character for transmission of the corresponding information to the data processing or storage unit associated with the device of the invention.

The device of the invention is mainly, but not exclusively, intended for teaching purposes and is suitable for use as a complete or partial examination aid by the pupil, who is thus enabled to answer test questions, the answers then being processed by the associated computer.

What we claim is:

1. A device designed to set up, display, encode and store information composed of characters, to be conveyed to data processing equipment or to an information storage unit, comprising in combination:

a. a plurality of separate supports each bearing at least one of such characters and each incorporating code-forming elements representing the character associated therewith;

b. a matrix made up of a number of matrix positions, each capable of accommodating one of said supports and equipped with a coder unit operated upon by said code-forming elements provided on said one of said supports placed in said matrix position and working out an encoded version of at least one of the characters borne by the latter said support; and c. circuits converting the encoded versions worked out by said coders into electric signals, and means for processing and storing informations constituted by said signals;

d. each of said coder units including an electric circuit fed from an electric current source and each of said encoded versions consisting of a voltage change appearing between two points in said electric circuit as the result of a corresponding change in the electrical characteristics of said circuit caused by the accommodation of said one of said supports on its matrix position.

2. A device as claimed in claim 1, in which said code-forming elements consist of sets of holes arranged at predetermined points on said supports, and in which each of said holes cooperates with a flexible electrically conductive strip to operate a corresponding electric contact in said electric circuit.

3. A device as claimed in claim 1, in which said coder unit includes a set of electric contact relays mechanically actuated by means of projecting parts arranged at predetermined points on said supports, and in which each of said projecting parts cooperates with a flexible electrically conductive strip to operate a corresponding electric contact in said electric circuit.

4. A device as claimed in claim 1, in which said code-forming elements consist of sets of electrically conductive areas arranged at predetermined points on said supports.

5. A device as claimed in claim 4 in which said coder unit includes a set of electric contact pairs so arranged that said conductive areas establish conductive connection between the two contacts of a contact pair located opposite each of said predetermined points.

6. A device as claimed in claim 1, in which said code-forming elements consist of sets of sections made of a material of high-magnetic permeability and arranged at predetermined points of said supports, each of said sections cooperating with a complementary magnetic circuit coupled with an inductive element included in said electric circuit.

7. A device as claimed in claim 6, in which said coder unit includes detector circuits whose states of magnetic polarization are affected by the presence or absence of said high-permeability sections.

8. A device as claimed in claim 6, in which said coder unit incorporates inductive circuit elements whose inductances are coupled to said high-permeability sections.

9. A device as claimed in claim 1, in which said code-forming elements are made up of sets of sections made of a high-dielectric constant material arranged at predetermined points on said supports, and in which each of said sections cooperates with a capacitive element included in said electric circuit.

10. A device as claimed in claim 1, in which said code-forming elements consist of an assembly of light-reflecting and nonlight-reflecting areas located at predetermined points on said supports, and in which light reflected by each of said reflecting areas is received by a photoelectric cell which delivers an electric current to said electric circuit.

* * * * *